United States Patent Office 3,137,564
Patented June 16, 1964

3,137,564
PROCESS FOR PRODUCING A SILICA GEL
FERTILIZER AND THE PRODUCT THEREOF
John W. Marx, Bartlesville, Okla., assignor to Phillips
Petroleum Company, a corporation of Delaware
No Drawing. Filed Sept. 4, 1959, Ser. No. 838,065
8 Claims. (Cl. 71—62)

This invention relates to novel fertilizer composition and methods for their preparation. In one aspect it relates to a composition comprising a silica gel matrix filled with a fertilizer material having plant nutrients selected from the group consisting of nitrogen, phosphorous and potassium. In another aspect it relates to a composition of a silica gel matrix filled with fertilizer material selected from the group consisting of urea and the ammonium salts of nitric, phosphoric, and sulfuric acids, and mixtures thereof.

In the prior art, numerous chemical fertilizers such as ammonium sulfate, ammonium nitrate and/or ammonium phosphate have been mixed with a siliceous material, such as sand, kieselguhr, diatomaceous earth, or the like, in an attempt to retard the generally rapid rate of leaching out of the fertilizer material by ground water. However, in each of the prior art compositions, the fertilizer constituent is so readily available that hard rains cause accelerated and wasteful consumption of highly soluble fertilizer compounds by the crops. Under conditions of soaking rains, the concentration of fertilizer in the vicinity of the plant roots may be so great as to cause actual damage to the plant, just as if unmixed fertilizer had been applied directly to the plants.

This deficiency is especially detrimental with regard to fruit and other plants that are as much in need of retained fertilizer content as they are in need of fertilizer application. It is becoming increasingly important to tailor a fertilizer material to the particular soil conditions in order to have plant food available over a substantial period for the crops which are to be fertilized.

It is also well known that trace elements such as boron, manganese, zinc, copper, iron and possibly molybdenum are necessary for the proper growth of plants. Most soils have sufficient trace elements present, but quite often deficiencies of one or more of these elements results in loss of foliage, loss of green color, wilting, spotting, stunting of growth, and loss of resistance to disease, or the like. When fertilizers are used on soils originally having sufficient amounts of trace elements, the supply may be depleted because of the accelerated plant growth caused by optimum major nutrient conditions. This is particularly true where artificial fertilizers are used, since their processes of manufacture generally utilize relatively pure chemicals for producing such fertilizers as ammonium nitrate, ammonium sulfate, urea, and the like. When the fertilizer material employed is prepared synthetically, it is advisable to add trace elements to the fertilizer material of this invention.

I have discovered that by concentrating fertilizer materials within a silica gel matrix there results a fertilizer compound which will be slowly leached and made available to the plant over a relatively long period of time, resulting in more efficient utilization of the fertilizer by the plant. The silica gel is very slightly soluble and will tend to lower the pH of the solvent (ground water), hence acidic soil reactions are aided in soils of an alkaline nature, or when growing some plant such as fruit trees in nonalkaline soils. Moreover, the silica gel structure will remain as such for a considerable time after the fertilizer material has leached out and will serve to impart properties of looseness and porosity to the soil.

It is an object of this invention to prepare new plant nutrient-containing compositions which are present in a porous matrix from which the nutrient, such as nitrogen compounds, potassium compounds, phosphorus compounds, and/or trace elements will be slowly leached by the action of ground water.

It is another object to deposit in the soil a conditioning agent which will be slowly dissolved and one whose dissolution lowers the pH of the solvent, and thus mildly aids acidic soil reactions in soils of an alkaline nature.

Another object is to provide an improved fertilizer.

Another object is to provide a fertilizer having a long life.

Numerous other objects and advantages will be apparent to those skilled in the art upon reading the accompanying specification and claims.

The fertilizer composition of this invention is prepared in accordance with the following general procedure. A dilute solution of a mineral acid, such as sulfuric or nitric acid, is prepared. A standard, form of uncoated fertilizer material, selected from the group consisting of urea or an ammonium salt of a mineral acid in solid or solution form is mixed into the acid solution which is being agitated. This mixing continues until a prescribed amount of fertilizer material has effected a substantially complete dissolution in the acid solution. A dilute solution of sodium or potassium silicate is separately prepared in a manner well known in the art, then is added with agitation to the acid solution of the fertilizer material. At this point, when desired, the addition of a previously prepared trace element solution may preferably be made. The rate of addition is in the range 0.25 to 1 gallon per 100 pounds of final fertilizer composition. The amount of solution added depends upon and is roughly directly proportional to the purity of the chemicals used in the manufacture of the major fertilizer material. When mixing of the solutions is complete, the contents of this vessel are pumped to a cooling vessel, which may have a doughnut-shaped removable inner vesself or segregating the gel solution during the cooling. In the cooling vessel, the gel solution temperature is quickly reduced and maintained below 80° C. until a silica gel matrix is formed because it has been found that temperatures above 80° C. have a deleterious effect on the matrix strength of the resulting product. When the resulting gel has cooled to about 27° C., the inner vessel containing the gel is removed from the cooling vessel so that another liner, and subsequently another charge can be introduced. In commercial installations, it would be preferable to cool the gel in partitioned cells, which may be similar to the ice cube forming trays in a conventional refrigerator, which can be emptied when recovery of the gel is desired. The removable doughnut it dismantled from the gel which is then broken into particles and strained through an 8-mesh screen. Fines, subsequently passing through a 20-mesh screen, are sent to a pelleting machine before recombining with the 8–20 mesh product. The 8–20 mesh product is charged to a tray drier through which air is passed at a temperature progressing from 90–120° C. during a 4-hour drying cycle. As a final step, the air is cut off and the oven is evacuated for an additional 30 minutes. A vacuum as low as 3 millimeters of mercury may be utilized. A final solid product of a predictable weight and having approximately a desired nutrient content is obtained. The fertilizer composition of this invention can be varied to give almost any standard analysis. This can be accomplished by the mixing, in suitable proportions, of commercially available fertilizer materials in a manner well-known to one skilled in the art. Successful results in the practice of this invention are obtained when said plant nutrient is selected from the group consisting of nitrogen, phosphorus and potassium compounds and combinations thereof. Illustrative of the nitrogen compounds useful in this invention are: ammonium nitrate, ammonium sulfate, ammoniated superphosphate, ammonium chloride, mono-ammonium phosphate, diammonium phosphate, calcium cyanamide, calcium nitrate and urea.

Illustrative of the phosphorus compounds suitable for the practice of this invention are: mono-ammonium phosphate, diammonium phosphate, superphosphate, triple superphosphate and phosphoric acid.

As examples of the potassium compounds useful in the practice of this invention, are the following: potassium nitrate, muriate of potash (commercial potassium chloride), potassium metaphosphate, potassium sulfate, potassium phosphate and sulphate magnesium-potassium. The best results in the practice of this invention are obtained when said plant nutrients are selected from the group consisting of mineral acids, urea and the ammonium salts of nitric, phosphoric and sulfuric acid, because these are known to be the best fertilizers of the prior art. Moreover, the weight ratio of the silica gel matrix to the fertilizer material can vary widely. The silica gel may range from 20 to 80 weight percent of said fertilizer composition, the remainder ranging between 80 and 20 weight percent fertilizer material. This can be accomplished in one of two ways, or by combining both. Firstly, the amount of solid fertilizer material added to the mineral acid solution can be varied considerably up to its limit of substantially complete dissolution in the acid. Secondly, the concentration of the alkali metal silicate in water solution, can also be varied. The novel composition of this invention provides an excellent method of controlling and regulating plant growth by its application to the soil.

In the early steps of the process of this invention, a jelly-like precipitate, referred to as hydrated silica or silicic acid, is obtained when an alkali metal silicate is acidified. The water proportion in hydrated silica, characterized by the general formula $SiO_2 \cdot nH_2O$, varies, decreasing gradually during drying and ignition proceeding until a relatively low water-content hydrated silica is achieved, which is termed silica gel. This silica gel, normally in the form of white amorphous pellets or lumps, forms the matrix, or continuous phase, of the fertilizer composition of this invention.

Copper, manganese, iron, boron, zinc, and molybdenum comprise the group known as the minor elements or trace elements. These designations are not altogether satisfactory, since they leave the impression that these elements are not of much importance in plant nutrition. However, the group has been so named because of the very small amounts in which they are found in plants rather than the importance of their functions, because they are fully as necessary as the major or secondary elements. There is evidence that the minor elements function as activators of enzymes and plant-growth-regulating substances in the synthesis and utilization within the plant of the many temporary and permanent organic compounds. At any rate, proof of the essentiality of these elements is comparatively recent. This invention provides an excellent and convenient means of adding the trace elements to the soil in a regulated manner.

It will be apparent that special fertilizer compositions according to this invention may be manufactured containing up to 10 times the normal requirements of certain trace elements, it being within the skill of the art to make such alterations to satisfy deficient soil conditions.

Boron is preferably added in the form of sodium tetraborate, either anhydrous or the pentahydrate. Copper is preferably added as the sulfate, either anhydrous or as the pentahydrate. Molybdenum can be added in the form of molybdic acid or molybdenum trioxide.

Iron may be added as ferric nitrate, ferric chloride, ferrous sulfate or ferric citrate. The latter form is more stable toward reaction with the other ingredients in the fertilizer solutions. When it is desired to make up large quantities of trace elements and store them for relatively long periods, it is preferable to prepare the iron solution separately from the other trace elements. In this procedure, one-fourth of the water by volume is utilized to dissolve the iron in one vessel and the other elements are blended in a second vessel in the remaining water, the two solutions are then mixed immediately before adding to the process at the previously described place. This prevents loss of iron content by interaction with the other trace element compounds in solution.

Regardless of the specific chemicals used, an aqueous solution is made up to contain the following amounts of trace elements.

| Element: | Pounds/1000 gallons water |
|---|---|
| Boron | 50 |
| Manganese | 50 |
| Zinc | 60 |
| Copper | 25 |
| Molybdenum | 20 |
| Iron | 250 |

Therefore, the trace elements present in the final fertilizer composition will range between 0.001 and 0.005 pound for each pound of fertilizer composition.

A demonstration of the usefulness of a product prepared according to the method of this invention was tried. Silica gel was precipitated in the presence of urea to prepare a solid having a 20 percent urea content by weight. This material was reduced to approximately one-quarter inch size and was thrown on an ordinary lawn. An adjacent control patch was treated with about an equal quantity of urea, that is, about 20 percent as much urea was distributed as of the amount of this novel fertilizer composition. After thirty days to six weeks, during which 3–5 heavy rains were encountered, some of these pellets were taken to the laboratory and analyzed for nitrogen content. These analyses indicated that approximately 3 percent urea was still present in the matrix. Upon standing in water for one week this urea had been leached from the matrix, indicating that substantially complete utilization of the fertilizer could be obtained after sufficient exposure to weathering conditions. An important result of this experimental test resides in the fact that the plot which was treated with the novel fertilizer appeared to be benefitted by the treatment, while the plot treated with urea alone turned yellow indicating severe root damage. Visual inspection showed that all the urea had been dissolved and carried into the soil after the first heavy rain. The plot upon which the novel fertilizer was placed was the first spot on the lawn to turn green the following spring. The plot treated with urea alone is now healthy but it does not show the beneficial results that are apparent from the plot treated with the novel fertilizer.

*Example I*

To prepare a 10–0–0 fertilizer in accordance with the method of this invention, 100 gallons of 10 percent sulfuric acid solution is mixed with 275 pounds of ammonium nitrate until the ammonium nitrate has dissolved in the acid. While agitating the contents of the above vessel, 100 gallons of sodium silicate solution containing 20 weight percent of solids having a composition expressed by $Na_2O \cdot 3.36SiO_2$ was added. When mixing was complete, the contents of this vessel was pumped to a cooling vessel having a doughnut-shaped removable inner vessel for segregating the gel solution during cooling. In the cooling vessel the gel temperature was reduced and maintained below 80° C. because it has been found that temperatures above 80° C. have a deleterious effect on the gel strength of the resulting product. When the gel has cooled to 80° C., the inner vessel containing the gel is removed from the cooling vessel so that another liner and subsequently another charge can be introduced. In commercial installations, it would be preferable to cool the gel in partitioned cells which can be broken down when recovery of the gel is desired. The removable doughnut is dismantled from the gel which is then broken into particles and strained through an 8 mesh screen. Fines passing through a 20-mesh screen are sent to a pelleting machine before combining with the 8 to 20 mesh product. The 8 to 20 mesh product is charged to a tray drier through which air at a temperature progressing from 90 to 120° C. is passed during a 4 hour drying cycle. As a final phase the air is cut off and the oven is evacuated for an additional 30 minutes. With the equipment available a vacuum of 3 millimeters mercury is obtained in the oven. A final product weighing 584 pounds and having a nitrogen content of 10 weight percent is obtained.

*Example II*

To prepare a 10–0–10 fertilizer in accordance with this invention, and utilizing the same Pilot Plant equipment as described in Example I, 100 gallons of 10 percent sulfuric acid solution and 352 pounds of ammonium sulfate are mixed to dissolve the ammonium sulfate. 100 gallons of a 30 degree Baumé (1.261 specific gravity) solution of potassium silicate having a potassia to silica weight ratio of about 1 to 3 (7.3 weight percent $K_2O$, 22 weight percent $SiO_2$). The product was removed, sized, dried and weighed as before. The product weighs 746 pounds and contains 10 weight percent nitrogen (N) and 10 weight percent potassia ($K_2O$).

*Example III*

To prepare a 20–0–0 fertilizer in accordance with this invention and utilizing the Pilot Plant described under Example I, 100 gallons of sodium silicate containing 20 weight percent $Na_2O \cdot 3.36SiO_2$ was added to 100 gallons of 10 percent sulfuric acid solution in which had been dissolved 457 pounds of ammonium nitrate. The product was dried and broken up as in Example I. The product weighs 766 pounds and contains 20 weight percent nitrogen (N).

*Example IV*

By substituting 100 gallons of 10 percent phosphoric acid for the 100 gallons of 10 percent sulfuric acid in Example I, the product is 583 pounds of 10–11–0 fertilizer.

*Example V*

By substituting 90 gallons of 10 percent phosphoric acid and 10 gallons of 10 percent sulfuric acid for the acid used in Example II, 745 pounds of product is obtained having a fertilizer designation 10–10–10.

*Example VI*

To prepare a 14–0–0 fertilizer in accordance with this invention and utilizing the Pilot Plant equipment as described in Example I, 100 gallons of 10 percent sulfuric acid solution are mixed with 275 pounds of urea until the urea is dissolved in the acid. 100 gallons of sodium silicate solution containing 20 weight percent $Na_2O \cdot 3.36SiO_2$ is added to the fertilizer-sulfuric acid solution. The product is dried and broken up as in Example I. A final product weighing 584 pounds and having a nitrogen content of about 14 weight percent is obtained.

Various modifications and alterations of this invention will become apparent to those skilled in the art without departing from the scope and spirit of this invention and it should be understood that this latter is not to be unduly limited to the foregoing discussion which set forth preferred examples for illustrative purposes.

Having described my invention, I claim:

1. A process for the production of a new fertilizer composition which comprises the steps of preparing a dilute solution of a mineral acid, mixing into said solution a fertilizer material selected from the group consisting of ammonium nitrate, ammonium sulfate, ammonium chloride, monoammonium phosphate, diammonium phosphate, calcium cyanamide, calcium nitrate, urea, superphosphate, triple superphosphate, phosphoric acid, potassium nitrate, potassium chloride, potassium metaphosphate, potassium sulfate, potassium phosphate, and magnesium-potassium sulfate, and mixtures thereof to attain substantially complete dissolution of said material to form a fertilizer solutions, preparing a dilute solution of an alkali metal salt of silicic acid, mixing the two last mentioned solutions together with agitation, then adding a previously prepared solution of trace elements selected from the group consisting of copper, manganese, iron, boron, zinc and molybdenum, and combinations thereof, said solution being added in a ratio of from 0.25 to 1 gallon per 100 pounds of fertilizer composition to be produced, pumping the resulting solution to a vessel adapted to segregating the gel solution during cooling, cooling said vessel below 80° C. until the temperature reached forms a silica gel about 27° C. removing said gel from said vessel and breaking it into particles that can be strained through an 8-mesh screen, any fines passing through a 20-mesh screen being pelleted before recombining with said particles passing through only an 8-mesh screen, charging the 8–20 mesh product to a tray drier oven, passing air through said product, heating said air progressively from 90 to 120° C. during a four hour cycle in said oven, evacuating said oven for 30 minutes during which a vacuum of about 3 millimeters of mercury is obtained, resulting in a product consisting essentially of a silica gel forming a porous matrix wherein is dispersed a water-soluble fertilizer material.

2. The process of claim 1 wherein said mineral acid is selected from the group consisting of nitric, phosphoric and sulfuric acid.

3. The process of claim 1 wherein the alkali metal salt of silicic acid is sodium silicate.

4. The process of claim 1 wherein the alkali metal salt of silicic acid is potassium silicate.

5. A process for the production of a new fertilizer composition which comprises the steps of preparing a dilute solution of a mineral acid, mixing into said solution a water-soluble fertilizer material selected from the group consisting of ammonium nitrate, ammonium sulfate, ammonium chloride, monoammonium phosphate, diammonium phosphate, calcium cyanamide, calcium nitrate, urea, superphosphate, triple superphosphate, phosphoric acid, potassium nitrate, potassium chloride, potassium metaphosphate, potassium sulfate, potassium phosphate, and magnesium-potassium sulfate, and mixtures thereof to attain substantially complete dissolution of said material, preparing a dilute solution of an alkali metal salt of silicic acid, mixing both of the two last mentioned solutions together with agitation, cooling the resulting solution below 80° C. and maintaining the same until a silica gel forms, comminuting the resulting gel sufficiently that it may all be passed through at least an 8-mesh screen, passing said comminuted gel through an 8-mesh and a 20-mesh sequentially, charging the 8–20 mesh product to an air drier means, passing air progressively heated from 90 to 120° C. through said comminuted gel, and evacuating said drier means for a period sufficient to attain a vacuum of about 3 millimeters of mercury.

6. A new fertilizer composition consisting essentially of a silica gel matrix, resulting from the drying of a hydrated silica, having concentrated in its porosity a water soluble fertilizer material selected from the group consisting of ammonium nitrate, ammonium sulfate, ammonium chloride, monoammonium phosphate, diammonium phosphate, calcium cyanamide, calcium nitrate, urea, superphosphate, triple superphosphate, phosphoric acid, potassium nitrate, potassium chloride, potassium metaphosphate, potassium sulfate, potassium phosphate, and magnesium potassium sulfate, and mixtures thereof and trace elements, said trace elements being selected from the group consisting of copper, manganese, iron, boron, zinc, molybdenum, and combinations thereof, said trace elements comprising between 0.001 and 0.005 pound for each pound of said fertilizer composition, the amount of the silica gel, the amount of the trace elements and the amount of the fertilizer material being in proportion to be effective to yield a slowly leachable composition.

7. A method of controlling and regulating plant growth comprising the application to the soil of the composition of claim 6.

8. A new fertilizer composition consisting essentially of a silica gel matrix, resulting from the drying of a hydrated silica, having concentrated in its porosity a water soluble fertilizer material of a predetermined formula and trace elements selected from the group consisting of copper, manganese, iron, boron, zinc, molybdenum, and combinations thereof, said trace elements comprising between 0.001 and 0.005 pound for each pound of said fertilizer composition, said fertilizer material being selected from the group consisting of ammonium nitrate, ammonium sulfate, ammonium chloride, mono-ammonium phosphate, diammonium phosphate, calcium cyanamide calcium nitrate, urea, superphosphate, triple superphosphate, phosphoric acid, potassium nitrate, potassium chloride, potassium metaphosphate, potassium sulfate, potassium phosphate, and magnesium-potassium sulfate, and combinations thereof, said silica gel comprising between 20 and 80 weight percent of said composition and the remainder of said composition comprises between 80 and 20 weight percent of the fertilizer material.

References Cited in the file of this patent
UNITED STATES PATENTS

| | | |
|---|---|---|
| Re. 7,296 | Popplein | Sept. 5, 1876 |
| 537,822 | Greenstreet | Apr. 23, 1895 |
| 1,893,812 | Weil | Jan. 10, 1933 |
| 2,147,985 | McKinney | Feb. 21, 1939 |
| 2,231,318 | Bierce | Feb. 11, 1941 |
| 2,900,349 | Schwartz | Aug. 18, 1959 |
| 2,903,349 | Bryant | Sept. 8, 1959 |
| 2,927,851 | Wilson | Mar. 8, 1960 |

FOREIGN PATENTS

| | | |
|---|---|---|
| 419,387 | Great Britain | Nov. 12, 1934 |

OTHER REFERENCES

Mellor: Comprehensive Treatise on Inorganic and Theoretical Chemistry, vol. 9, page 719. Copy in Sci. Lib. QD 31M4.